United States Patent
Abraham et al.

(10) Patent No.: US 10,319,230 B2
(45) Date of Patent: Jun. 11, 2019

(54) SAFE SPEED LIMIT RECOMMENDATION

(71) Applicant: International Business Machines Corporation, Armonk, NY (US)

(72) Inventors: Subil M. Abraham, Plano, TX (US); Vinod A. Bijlani, Pune (IN); Mathews Thomas, Flower Mound, TX (US); Suyesh R. Tiwari, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/492,704

(22) Filed: Sep. 22, 2014

(65) Prior Publication Data

US 2016/0086487 A1    Mar. 24, 2016

(51) Int. Cl.
| | |
|---|---|
| G08G 1/16 | (2006.01) |
| H04W 4/60 | (2018.01) |
| G08G 1/0967 | (2006.01) |
| H04W 4/04 | (2009.01) |

(52) U.S. Cl.
CPC .. *G08G 1/096716* (2013.01); *G08G 1/096741* (2013.01); *G08G 1/096775* (2013.01); *G08G 1/163* (2013.01); *H04W 4/046* (2013.01); *G08G 1/09675* (2013.01); *G08G 1/096791* (2013.01); *H04W 4/60* (2018.02)

(58) Field of Classification Search
None
See application file for complete search history.

(56) References Cited

U.S. PATENT DOCUMENTS

| | | | | |
|---|---|---|---|---|
| 7,629,899 B2 * | 12/2009 | Breed | ............... | B60N 2/2863 340/435 |
| 7,840,355 B2 * | 11/2010 | Breed | ............... | B60N 2/2863 340/995.1 |
| 7,902,969 B2 | 3/2011 | Obradovich | | |
| 8,248,223 B2 | 8/2012 | Periwal | | |
| 8,290,701 B2 | 10/2012 | Mason et al. | | |

(Continued)

OTHER PUBLICATIONS

Revathi, N. et al., "Automatic Sensing and Alerting System of Speed Bumps in Speeding Motor Vehicles," Dept. of Digital Electronics and Communication Systems, Visvesvaraya Tech. Univ., retrieved Jun. 16, 2014, retrieved from the Internet: <www.share-pdf.com/fbf8c1...cd4147012658/GMIT 1.pdf>, 5 pg.

(Continued)

*Primary Examiner* — Krishnan Ramesh
(74) *Attorney, Agent, or Firm* — Cuenot, Forsythe & Kim, LLC

(57) ABSTRACT

In a computer-implemented system, a plurality of inputs related to vehicle safe speed data for a first vehicle are received. These inputs include vehicle data received from one or more other vehicles proximate the first vehicle, historical data traffic condition information, predictive data regarding future traffic conditions, history data of a current driver of the first vehicle, current vehicle condition data, and current reaction of the current driver. Based upon the plurality of inputs, a recommended safe speed limit for the current driver is determined, and the determined recommended safe speed limit is presented to the current driver. The recommended safe speed limit is a calculated maximum speed, in real time, that the current driver should be driving.

20 Claims, 5 Drawing Sheets

(56) References Cited

U.S. PATENT DOCUMENTS

| | | | | |
|---|---|---|---|---|
| 8,725,394 | B2* | 5/2014 | Bahlmann | B60W 30/146 340/907 |
| 9,147,353 | B1* | 9/2015 | Slusar | G09B 19/167 |
| 2009/0115638 | A1* | 5/2009 | Shankwitz | G01C 21/26 340/988 |
| 2010/0007523 | A1 | 1/2010 | Hatav | |
| 2012/0068858 | A1* | 3/2012 | Fredkin | G08G 1/096741 340/902 |
| 2012/0158276 | A1* | 6/2012 | Kim | G08G 1/0962 701/119 |
| 2012/0283942 | A1* | 11/2012 | T'Siobbel | G01C 21/26 701/410 |
| 2013/0245945 | A1* | 9/2013 | Morita | G08G 1/096716 701/533 |
| 2014/0244156 | A1* | 8/2014 | Magnusson | G01C 21/34 701/418 |
| 2015/0178998 | A1* | 6/2015 | Attard | G07C 5/008 701/23 |

OTHER PUBLICATIONS

"Smarter Highways Variable Speed Limits," [online] Washington State Dept. of Transportation © 2009 [retrieved Jun. 16, 2014] retrieved from the Internet: <http://www.wsdot.wa.gov/smarterhighways/vsl.htm>, 2 pg.

"Variable Advisory Speeds," [online] Missouri Department of Transportation © 2013 [retrieved Jun. 16, 2014] retrieved from the Internet: <http://www.modot.org/stlouis/links/VariableSpeedLimits.htm>, 2 pg.

\* cited by examiner

400

---

Receiving a plurality of inputs related to vehicle safe speed data for a first vehicle, the plurality of first inputs including vehicle data received from one or more other vehicles proximate the first vehicle and communicatively linked to the first vehicle
405

---

Determining a recommended safe speed limit for a current driver of the first vehicle based on the plurality of inputs
410

---

Presenting the determined recommended safe speed limit to the current driver of the vehicle
415

FIG. 4

SAFE SPEED LIMIT RECOMMENDATION

BACKGROUND

Arrangements described herein relate to providing personalized speed limit information to a current driver of a vehicle.

Speed limits are used to improve road traffic safety and reduce the number of road traffic casualties from traffic collisions. Speed limits establish the maximum speed or the minimum speed at which vehicles may legally travel on a particular segment of a road. Drivers are informed of the prevailing speed limit by traffic signs provided along the side of a road or above a road. The speed limit applies to all drivers traveling on the particular segment of the road.

SUMMARY

According to an embodiment of the present invention, arrangements are directed to a method of determining personalized speed limit information. The method can include receiving a plurality of inputs related to vehicle safe speed data for a first vehicle. The plurality of inputs can include vehicle data received from one or more other vehicles proximate the first vehicle and communicatively linked to the first vehicle. The method can also include determining, using a processor, a recommended safe speed limit for a current driver of the first vehicle based on the plurality of inputs. The method can further include presenting the determined recommended safe speed limit to the current driver of the first vehicle.

A system includes a processor programmed to initiate executable operations. The executable operations include receiving a plurality of inputs related to vehicle safe speed data for a first vehicle. The plurality of inputs can include vehicle data received from one or more other vehicles proximate the first vehicle and communicatively linked to the first vehicle. The executable operations can also include determining a recommended safe speed limit for a current driver of the first vehicle based on the plurality of inputs. The executable operations can further include presenting the determined recommended safe speed limit to the current driver of the first vehicle.

A computer program product for determining personalized speed limit information includes a computer readable storage medium having program code embodied therewith. The program code is executable by a processor to perform a method. The method can include receiving a plurality of inputs related to vehicle safe speed data for a first vehicle. The plurality of inputs can include vehicle data received from one or more other vehicles proximate the first vehicle and communicatively linked to the first vehicle. The method can include determining a recommended safe speed limit for a current driver of the first vehicle based on the plurality of inputs. The method can further include presenting the determined recommended safe speed limit to the current driver of the first vehicle.

BRIEF DESCRIPTION OF THE SEVERAL VIEWS OF THE DRAWINGS

FIG. 4 is a flow chart illustrating a method of determining personalized speed limit information in accordance with one embodiment disclosed within this specification.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to personalized speed limit information for a vehicle. Personalized speed limit information can be determined based on one or more inputs related to vehicle safe speed data for the vehicle. The vehicle safe speed data can be received from any suitable vehicle safe speed data source. The personalized speed limit information can be presented to a driver of the vehicle and/or to other recipients. In some instances, the personalized speed limit information can be reviewed and followed at the discretion of the driver.

Figure 1:
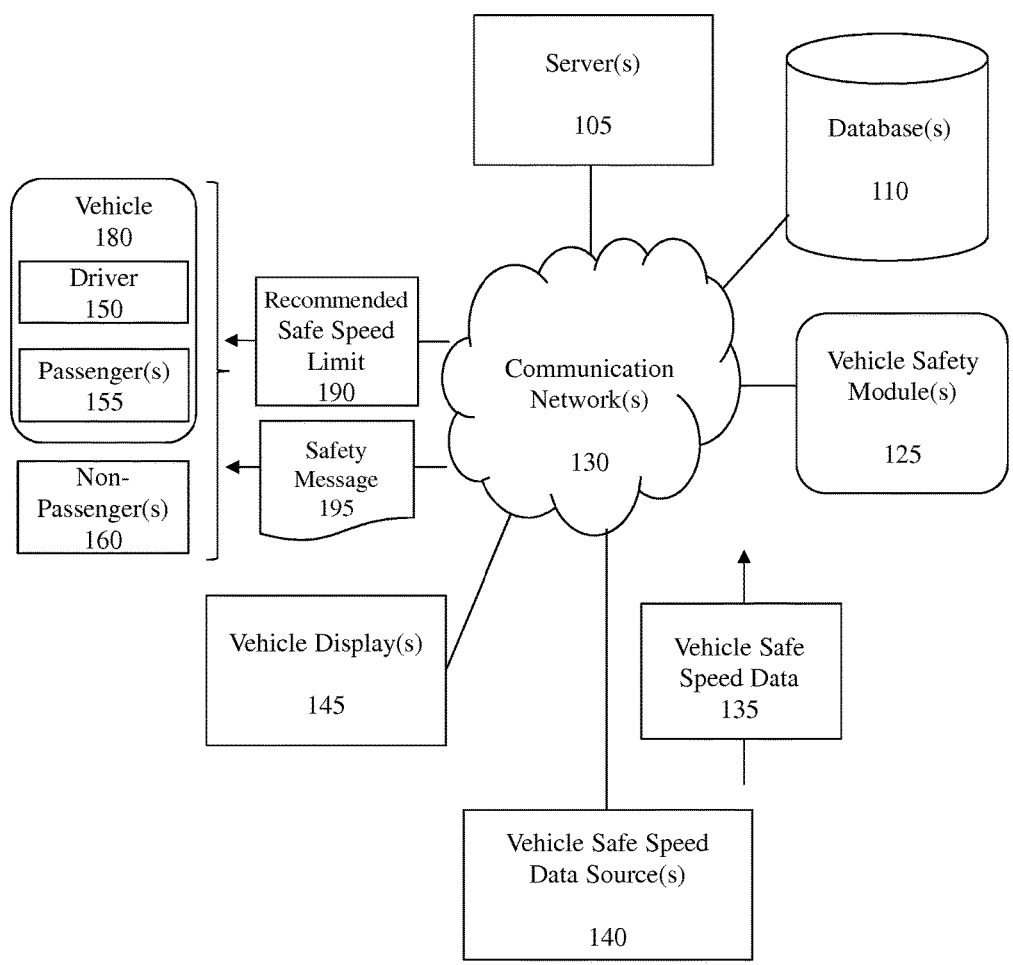
FIG. 1 is a block diagram illustrating a system for determining personalized speed limit information in accordance with one embodiment disclosed within this specification.

FIG. 1 is a block diagram illustrating a system 100 for determining personalized speed limit information in accordance with one embodiment of the present invention. The system 100 can include one or more servers 105, one or more databases 110, and one or more vehicle safety modules 125. The vehicle safety module 125 and/or the database 110 can be components of the sever 105, or the vehicle safety module 125 and/or the database 110 can be executed on and/or distributed among other processing systems to which the server 105 is communicatively linked. The server 105 can include suitable operational software for performing the various functions described herein. The system 100 can further include one or more vehicle safe speed data sources 140.

The various components of system 100 can be communicatively linked through one or more communication networks 130. As used herein, the term "communicatively linked" can include direct or indirect connections through a communication channel or pathway or another component or system. A "communication network" means one or more components designed to transmit and/or receive information from one source to another.

The one or more communication networks 130 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 130 further can be implemented as or include one or more wireless networks, whether short or long range. For example, in terms of short range wireless networks, the communication network 130 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 130 can include a mobile, cellular, and or satellite-based wireless network and support voice, video, text, and/or any combination thereof. Examples of long range wireless networks can include GSM, TDMA, CDMA, WCDMA networks or the like. The communication network 130 can include wired communication links and/or wireless communication links. The communication network 130 can include any combination of the above networks and/or other types of networks. The network can include one or more routers, switches, access points, wireless access points, and/or the like.

The server 105, the database 110 and/or the vehicle safety module 125 can be provided in any suitable location. In one or more implementations, the server 105, the database 110 and/or the vehicle safety module 12 can be located in a vehicle 180. "Vehicle" means any form of mechanized transport. In one or more arrangements, the vehicle 180 can be an automobile. In some implementations, the vehicle 180 may be a watercraft or an aircraft or any other form of mechanized transport.

The vehicle 180 can include one or more displays 145. A "display" is defined as a component or a group of components that present information/data in visual form. The display 145 can be any suitable type of display. In one or more arrangements, the display 145 can be a touch screen display or a multi-touch display. The touch screen can allow a user to engage or interact with one or more displayed elements, such as a graphical user interface (GUI), and/or other applications running on any vehicle system, including any of those described herein, through contact with the display 145. For example, a user may make selections and move a cursor by simply touching the display 145 via a finger or stylus. In one or more arrangements, the display 145 can be any suitable surface within the vehicle 180 upon which information or data is projected. For instance, the display 145 can be a windshield projection system or a side window projection system. As another example, the display 145 can be a dashboard display, console display or part of an in-vehicle entertainment system.

The vehicle 180 can include a driver 150 and one or more passengers 155. A "driver" is a person or entity that is actually driving the vehicle. "Passenger" means a person who is actually located within or on the vehicle. The system 100 can include one or more non-passengers 160. "Non-passenger" means any person who is not located within or on the vehicle. In some arrangements, one or more of the non-passengers 160 can be related to one or more occupants (the driver 150 and/or one or more of the passengers 155) of the vehicle 180. For instance, the non-passenger 160 can be a parent or legal guardian of at least one of the passengers of the vehicle 180. Alternatively, the non-passenger 160 can be an employer of one or more of the passengers of the vehicle 180. Still alternatively, the non-passenger 160 can be a teacher or instructor of one or more of the passengers of the vehicle 180.

In one embodiment, the vehicle safety module 125 can be stored on, accessed by and/or executed on the one or more messaging servers 105. The vehicle safety module 125 can be implemented as computer readable program code that, when executed by a processor, implement the various processes described herein. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The vehicle safety module 125 can collect vehicle safe speed data 135, that is, data relevant to determining a recommended safe speed limit of a vehicle. The data can be collected in any suitable manner by the vehicle safety module 125. The data collection can be performed on any suitable basis, such as continuous, periodic, irregular or even randomly. The collected data can be stored in the database 110. In one embodiment, the database 110 can be stored on, accessed by and/or executed on the server 105. It should be appreciated that while a single database is illustrated in FIG. 1, there can be a plurality of databases, each storing at least a portion of the collected vehicle safe speed data 135 and/or other data items associated therewith.

The vehicle safety module 125 can collect data from one or more vehicle safe speed data sources 140. "Vehicle safe speed data source" means any source from which data can be obtained and which data is useful in determining a recommended safe speed for a vehicle.

The vehicle safe speed data sources 140 can be located inside of a vehicle and/or outside of a vehicle. The vehicle safe speed data sources 140 can include current or real-time data. The vehicle safe speed data sources 140 can include predicted data and/or historical data. Data can be obtained from the vehicle safe speed data sources 140 in any suitable manner, including, for example, by, directly or indirectly, sensing, measuring, detecting, extrapolating, interpolating, accessing and/or recording. Data obtained from the one or more vehicle safe speed data sources 140 can be stored in the database 110.

Figure 2:
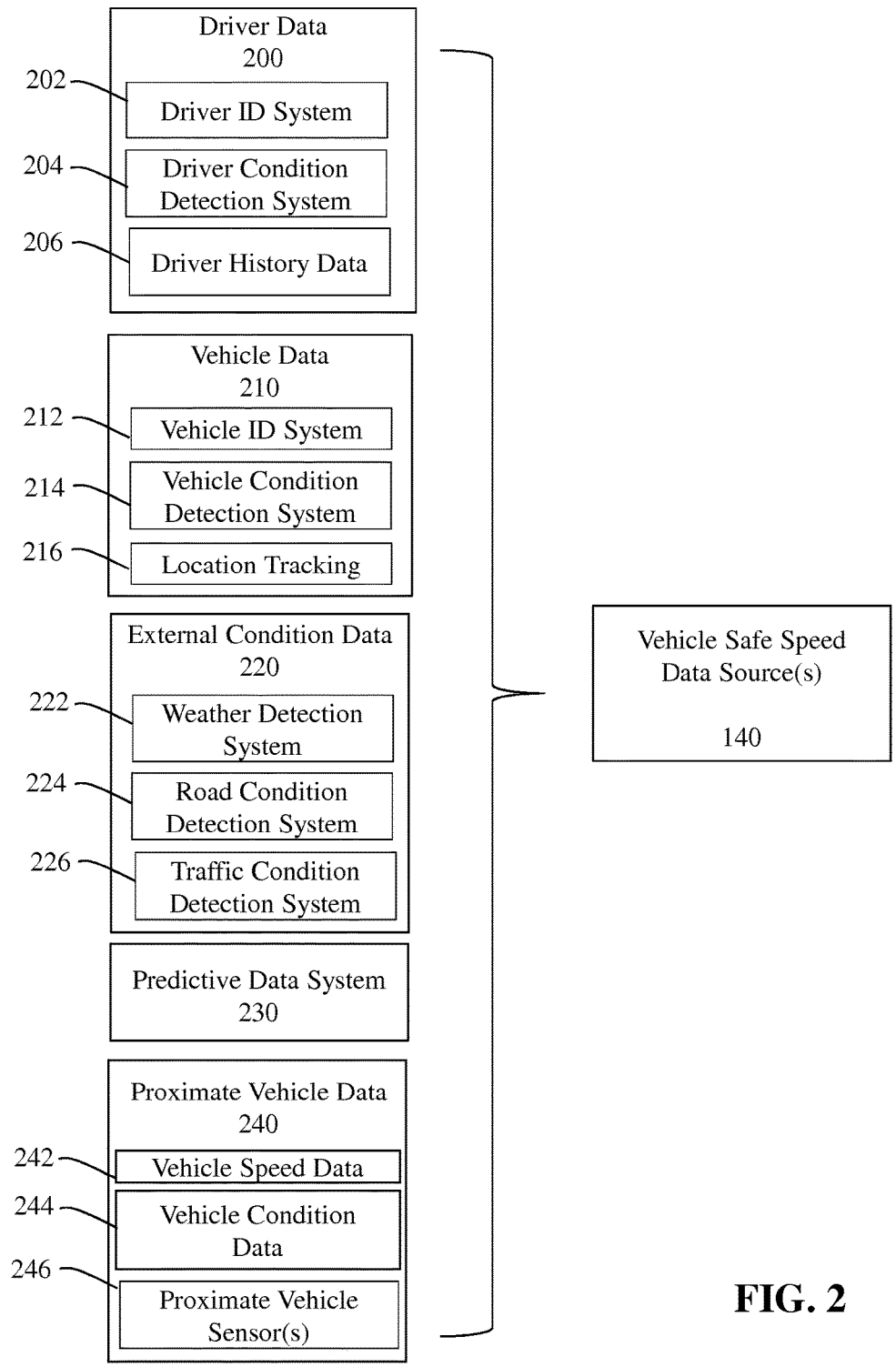
FIG. 2 is a block diagram illustrating various examples of vehicle safe speed data sources in accordance with one embodiment disclosed within this specification.

FIG. 2 shows various non-limiting examples of vehicle safe speed data sources 140. For instance, the vehicle safe speed data sources 140 can include one or more driver data sources 200, one or more vehicle data sources 210, one or more external condition data sources 220, one or more predictive data sources 230 and/or one or more proximate vehicle sources 240. Each of these potential vehicle safe speed data sources 140 will be described in turn below.

The driver data source 200 can be any source of information or data concerning the current driver 150 of the vehicle 180. As an example, the data can include the identity of the driver. The identity of the driver can be determined by one or more driver identification systems 202. "Driver identification system" means any device, component or system that can determine the identity of a driver based on one or more inputs. The driver identification system 202 can include one or more sensors. The driver identification system 202 can be configured to determine the identity of the current driver in real-time, as the driver may change at some point (e.g. after a segment of a drive). As used herein, the term "real-time" means a level of processing responsiveness that a user or system senses as sufficiently immediate for a particular process or determination to be made, or that enables the processor to keep up with some external process.

In one or more arrangements, the driver identification system 202 can include one or more biometric identification systems, including, for example, retinal, iris, facial, palm, fingerprint, voice and/or other biometric recognition technologies to identify the driver. The driver identification system 202 can include a suitable camera, scanner, sensor, other hardware and/or software for retinal, iris, facial, palm, fingerprint, voice and/or other biometric recognition.

In one or more arrangements, the driver identification system 202 can determine the identity of the driver based on the weight of a person sitting in the driver seat or a pressure profile of a person sitting in the driver seat. The driver identification system 202 can include a weight sensor and/or a pressure sensor. In one or more arrangements, the driver identification system 202 can determine the identity of the driver based on a seat adjustment profile. Some vehicles can store seat adjustment profiles for one or more drivers of the vehicle. When a particular seat adjustment profile is selected or if a current seat adjustment profile matches a stored seat adjustment profile, then the driver identification system 202 can identify the driver based on the seat adjustment profile. In one or more arrangements, the driver identification 202 can determine the identity of the driver based on a name, password, code or other input received from the driver, such as through an in-vehicle user-interface.

In one or more arrangements, the driver identification system 202 can determine the identity of the driver based on the detection of a mobile device associated with a particular individual. For instance, if the driver has a mobile phone, tablet or laptop computer in the vehicle, then the driver identification system 202 can be configured to detect such device. For instance, the device can become communicatively linked with one or more systems of the vehicle 180.

The data concerning the current driver 150 of the vehicle 180 can include data on the age of the driver 150 and/or past driving records of the driver 150. The data concerning the current driver 150 of the vehicle 180 can also include data about the condition of a driver and/or the behavior of the driver. To that end, the system 100 can include one or more driver condition detection systems 204. "Driver condition detection system" any device, component or system that can detect, determine or assess a current condition, current behavioral state and/or current cognitive state of a driver based on one or more inputs. The one or more driver condition detection systems 204 can include one or more sensors. The driver condition detection system 204 can be configured to determine or assess a current condition, behavioral state and/or cognitive state of a driver in real-time, as such things may change over time.

Examples of various items that can be detected, determined or assessed by the driver condition detection system 204 will now be described. In one or more arrangements, the driver condition detection system 204 can determine how long the current driver has been driving the vehicle. The driver condition detection system 204 can be detect, determine or assess whether a driver is exhibiting characteristics of a tired driver. For instance, the driver condition detection systems 204 can detect, determine or assess whether the driver is drinking coffee, such as from a sensor operatively connected to a vehicle cup holder. The sensor can detect the presence of a container in the cup holder, the temperature of a fluid in the container, the rate at which fluid is consumed, and/or the content of the container, etc.

The driver condition detection system 204 can detect the frequency at which the driver is changing lanes. The driver condition detection system 204 can detect whether the driver is swerving. The driver condition detection system 204 can detect vehicle deceleration rates. The driver condition detection system 204 can detect braking frequency. The driver condition detection system 204 can detect changes in speed and/or the magnitude of changes in speed by, for example, monitoring the speedometer. The driver condition detection system 204 cam also determine the time of day.

The driver condition detection systems 204 can also detect, determine or assess the cognitive state of the driver. For instance, the driver condition detection system 204 can assess the response time of a driver, such as upon detecting an obstacle. The response time of the driver can be assessed in various weather conditions (e.g. rain, fog, smoke, limited visibility).

The reaction time of a driver can depend on the age of the driver, the amount of driving experience of the driver and cognitive aspects. Stopping sight distance is the distance traveled from the instant the driver sees and recognizes a hazard to the instant the brakes are applied (brake reaction time) plus the distance actually needed to stop the vehicle (braking distance) The stopping distance varies based on: driver reaction times, vehicle Deceleration rates, braking efficiency, coefficient of adhesion, and roadway grade. To understand the cognitive aspect of the driver, the system can be configured to conduct one or more tests of the driver. The system can be used to monitor the speedometer of the vehicle.

Driver reaction time is then calculated by monitoring the vehicle at a particular speed and after a certain time, the system can generate an audible indicator (e.g. a beeping noise). The time will be calculated or measured between the time the beep noise is made and the driver actually applying the brakes. From such a test, the system can be configured to determine one or more parameters. Examples of such parameters include: the distance and/or time traveled by the vehicle from the time the audible indicator was generated and the time the driver began to apply the brakes. This parameter can provide information regarding the response time of the drive.

Another example of a suitable parameter is the distance and/or time traveled by the vehicle from the time the audible indicator was generated and the time the vehicle stops completely. Still another example of a suitable parameter is the distance and/or time traveled by the vehicle from the time the driver began to apply the brakes to the time the vehicle stops completely. These parameters can provide information regarding the acceleration/deceleration pattern of the driver.

The data concerning the current driver 150 of the vehicle can also include the historical or current preferences of a driver. For instance, the driver condition detection system 204 can also detect, determine or assess whether the driver is in a hurry or whether the driver is driving at leisurely pace. The driver condition detection system 204 can make such a determination in any suitable manner. For instance, the driver 150 can indicate the nature of the travel by input into a user interface. Alternatively or in addition, the driver condition detection system 204 can assess the history for a particular travel path, segment of a travel path or destination.

Further, the data concerning the current driver 150 of the vehicle can also include driver history data 206. Driver history data 206 can be stored in the one or more databases 110. Driver history data 206 can include past driving records, past reaction times, past accidents, one or more conditions (e.g. weather, vehicle, etc.) of past accidents of the driver. Driver history data 206 can also include any data described herein, as such data can be recorded and stored by the system 100.

As noted above, the vehicle data source 204 can be one of the vehicle safe speed data sources 140. The vehicle data source 204 can be any source of current or past information or data concerning the vehicle 180, including any component, system or device thereof. As an example, the information or data can relate to the identity of the vehicle. The identity of the vehicle can be determined by one or more vehicle identification systems 212. "Vehicle identification system" means any device, component or system that can determine the identity of a vehicle.

In one or more arrangements, the vehicle identification system 212 can query or access one or more databases database (e.g. database 110) containing information about the vehicle. Such information or data can include information that does not change, such as, for example, made, model, year, specifications, etc. Other information or data can include the last service date of the vehicle and weight of the vehicle. The weight of the vehicle can be determined in real-time. The safe speed will differ for a heavily loaded vehicle compared to an empty vehicle. The databases can be located on board the vehicle and/or remote from the vehicle. The vehicle identification system 212 can include one or more sensors to detect, determine or assess the identity of the vehicle. The vehicle identification system 212 can be configured to determine the identity of the vehicle in real-time.

The recommended safe vehicle speed can be affected by the type of vehicle. For instance, a truck's maximum safe speed on a horizontal curve under wet conditions may be less than a car's maximum safe speed under the same conditions. Also, antilock brakes reduce wheel lock under braking. This in turn reduces the likelihood of skidding on slippery pavement.

The vehicle data 210 can also include information or data about the current or past condition of the vehicle 180, including any component, system or device thereof. The system 100 can include one or more vehicle condition detection systems 214. "Vehicle condition detection system" means any device, component or system that can detect, determine or assess a current or past condition of a vehicle based on one or more inputs. The one or more vehicle condition detection systems 214 can include one or more sensors. The one or more vehicle condition detection systems 214 can include a diagnostic system of the vehicle. The vehicle condition detection system 214 can be configured to determine or assess a current vehicle condition in real-time.

Examples of various items that can be detected, determined or assessed by the vehicle condition detection system 214 will now be described. In one or more arrangements, the vehicle condition detection system 214 can detect, determine or assess tire condition, tire pressure and/or tire wear. Any suitable sensors can be used to assess the current condition of the tires. The vehicle condition detection system 214 can detect, determine or assess the condition of the brakes of the vehicle or any other component or system of the vehicle that is relevant to determining a recommended safe speed limit for the vehicle. Information about the tires can be relevant to the coefficient of friction between the road and the vehicle.

Further, the vehicle condition detection system 214 can detect, determine or assess the efficiency of a component or system of the vehicle that is relevant to determining a recommended safe speed limit for the vehicle. For instance, the vehicle condition detection system 214 can detect, determine or assess braking efficiency. This data can vary depending on the type of braking system used in the vehicle. For instance, a vehicle having an antilock braking system may have a greater braking efficiency than a vehicle that does not have such a braking system.

The vehicle data 210 can also include information on the current travel destination and/or current location of the vehicle. The system can include one or more vehicle location tracking systems 216. In one or more arrangements, the vehicle 180 can be communicatively linked to a suitable location tracking system 216. "Location tracking system" means any device, component or system capable of determining the geographical location of the vehicle. For example, the location tracking system 216 can be a GPS (e.g., the NAVSTR GPS) or a triangulation system that determines a devices location by the strength of its signals as measured by multiple signal monitors (e.g., cell towers or WI-FI transceivers). Further, the location tracking system 216 can include a global positioning system, a local positioning system or a geolocation system. The positioning system may be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. In some cases, the positional information obtained by the location tracking system 216 might round coordinates to less specific locations or otherwise use fuzzy logic processing to reduce the specificity of the specific positional data. Further, the location tracking system 216 can use Transmission Control Protocol (TCP) and/or a Geographic information system (GIS) and location services.

Alternatively or in addition, the location tracking system 216 can be based on access point geolocation services, such as using the W3C Geolocation Application Programming Interface (API). With such a system, the location of the vehicle 180 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle is determined will depend on the manner of operation of the particular location tracking system used.

As noted above, the external condition data sources 220 can be one of the vehicle safe speed data sources 140. The external condition data sources 220 can be any source of current or past information or data concerning things outside of a vehicle and that are relevant to the determination of a recommended safe speed limit.

One example of an external condition data source 220 is a weather detection system 222. The "weather detection system" means any device, component or system that can determine current, past and/or future information about weather in a location, area or region. The weather detection system 222 can be configured to determine or obtain weather data in real-time.

In one or more arrangements, the weather detection system 222 can include one or more weather sensors. The one or more weather sensors can be used to obtain weather data in any suitable manner, such as by direct or indirect measuring, detecting, determining and/or sensing. For instance, the weather sensors can be operable to detect, determine, assess, measure and/or sense whether there is rain, fog, ice, storms and/or other weather conditions in the environment outside of the vehicle. In one or more arrangements, the weather detection system can include one or more vision sensors. The one or more vision sensors can be configured to determine the sight or visibility distance of the vehicle under the prevailing weather conditions. Sight distance is the length of roadway ahead that is visible to the driver. Sight distance is comprised of driver-perception reaction time and the time to complete the maneuver safely. The speed limit needs to be changed if the stopping distance exceeds the available sight distance. The sight distance is usually calculated based on manual inspection or by using visibility sensors under rain, snow or fog conditions.

The weather detection system 222 can be configured to determine a weather coefficient. The weather coefficient can provide the impact of weather on the current speed. As an example, in the case of heavy snow, the coefficient between the road and the tires of the vehicle can decrease significantly, which affects the recommended safe speed for the particular road segment where such conditions are present.

The weather detection system 222 can be configured to obtain weather information or data from any suitable source of weather data, such as a weather database, a weather news source, an online weather database (e.g. weather-related website(s)) or other suitable source.

Another example of an external condition data source 220 is a road condition detection system 224. "Road condition detection system" means any device, component or system that can determine current and/or past information or data about the condition and/or characteristics of a road. The road condition detection system 224 can be configured to determine or obtain road information or data in real-time.

In one or more arrangements, the road condition detection system 224 can include one or more road condition sensors. The one or more road condition sensors can be used to obtain road condition data in any suitable manner, such as by direct or indirect measuring, detecting, determining, assessing and/or sensing. Such information can be obtained by measurement, detection or sensing of the road by any suitable sensors. For instance, the vehicle can include one or more road sensors. For instance, the one or more road sensors can be operable to detect, determine, assess, measure and/or sense the type of road, the material of the road, the grade of the road, the smoothness of the road, and/or the dryness or wetness of the road.

The road condition detection system 224 can be configured to obtain road condition information or data from any suitable source of such information or data. For instance, the road condition detection system 224 can be configured to obtain such information from a road condition database, publication, system or other suitable source. As an example, the road condition detection system 224 can access or obtain information available from one or more public agencies (e.g. a national, state or local department of transportation) and/or one or more public groups (e.g. a news reporting agencies). Further, the one or more road condition sensors can be configured to access and/or obtain data from sensor systems external to the vehicle 180. For instance, if the road includes sensors for determining road condition information, then the one or more road condition sensors can be configured to access or obtain such information.

Alternatively or in addition, such information or data can be obtained from a road network system or geographic information system (GIS) data. In some arrangements, the road condition detection system 224 can determine a coefficient of road adhesion. Such a determination can be made in real-time. Further, the road condition detection system 224 can use other information obtained by the system 100 to determine the coefficient of road adhesion. For instance, the coefficient of road adhesion can be adjusted based on weather data (e.g. a current or recent amount of rainfall).

Still another example of an external condition data source 220 is a traffic condition detection system 226. "Traffic condition detection system" means any device, component or system that can determine current, future and/or past information or data about the traffic in the location, area or region or on a particular road, segment of road, or intersection. As used herein, the term "road" means any surface upon which a motorized vehicle can travel. It includes roads, highways, expressways, dirt roads, paved or unpaved roads, etc. The traffic condition detection system 226 can be configured to determine or obtain traffic related information or data in real-time.

In one or more arrangements, the traffic condition detection system 226 can include one or more traffic sensors. The one or more traffic sensors can be used to obtain traffic information or data in any suitable manner, such as by direct or indirect measuring, detecting, determining, assessing and/or sensing. The traffic condition detection system 226 can be configured to obtain traffic condition information or data from any suitable source of such information or data. For instance, the traffic condition detection system 226 can be configured to obtain such information from a traffic condition database, a traffic news source, an online traffic database (e.g. a traffic-related website), publication, system or source, as may be available from one or more public agencies (e.g. a national, state or local department of transportation) and/or one or more public groups (e.g. a news reporting agencies).

Examples of traffic condition data that can be obtained by the traffic condition detection system 226 includes: traffic alerts, road closures, accidents, congestion, construction, current traffic speed, posted speed limit and/or other traffic related events. The traffic condition detection system 226 can collect historical traffic condition information (e.g. local historical accident data) from any suitable source.

As noted above, the predictive data system 230 can be one of the vehicle safe speed data sources 140. The predictive data system 230 can be any source of future information or data concerning things outside of a vehicle and that are relevant to the determination of a recommended safe speed limit. For instance, based on current traffic flow, historical patterns, time of day, and/or other information, the predictive data system 240 can predict that traffic will become very heavy within a period of time (e.g. within 20 minutes), so the system 100 can take this predictive data into account when determining a safe speed limit.

The predictive data system 230 can access data from any of the vehicle safe speed data sources 140 described herein and/or other source. In some arrangements, the predictive system 230 can be a part of one or more of the other vehicle safe speed data sources 140 described herein.

Figure 3:
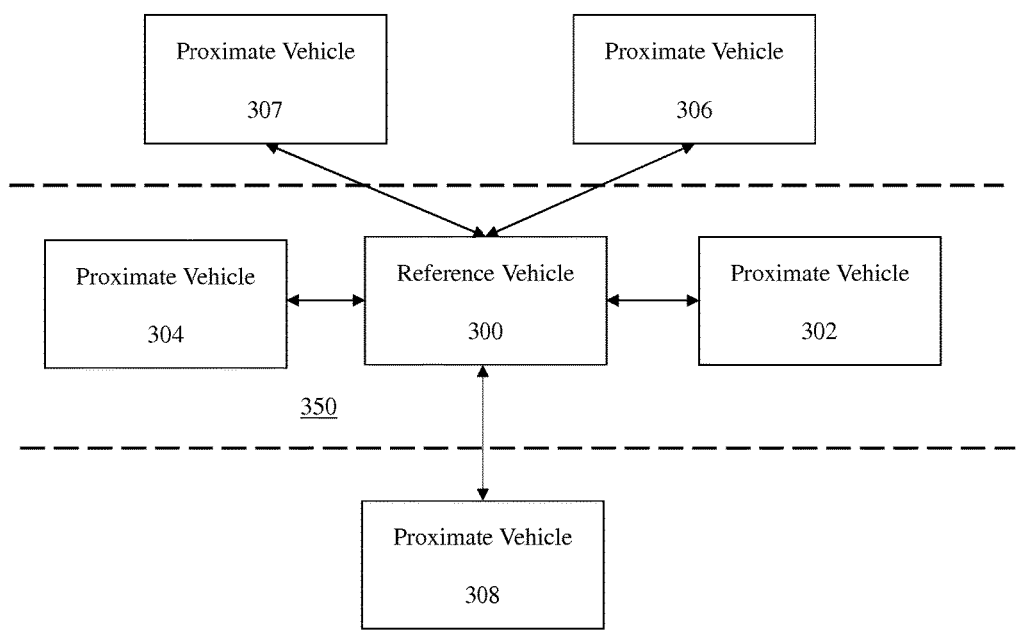
FIG. 3 is a block diagram illustrating a system of a plurality of communicatively linked vehicles in accordance with one embodiment disclosed within this specification.

As noted above, the proximate vehicle data source 240 can be one of the vehicle safe speed data sources 140. The "proximate vehicle data source" is any source of information or data concerning one or more vehicles located proximate a reference vehicle. A proximate vehicle is one that is located within a predetermined distance from a reference vehicle. The proximate vehicle can be located on the same road as the reference vehicle. FIG. 3 shows various examples of proximate vehicles. A reference vehicle 300 is shown traveling on a road 350. The proximate vehicle(s) can include a vehicle that is located in front of the reference vehicle 302, a vehicle that is located behind the reference vehicle 304, or to a side of a reference vehicle 306, 307, 308. The proximate vehicles 302, 304, 306, 307, 308 can be located within a predetermined distance from the reference vehicle 300 or within a distance allowed by the particular communication link between the reference vehicle and the proximate vehicle. In some arrangements, a proximate vehicle can be a vehicle that is separated from the reference vehicle by one or more other proximate vehicles. The predetermined distance can be defined by a radius or in any other manner. In some arrangements, data obtained from vehicles from beyond the predetermined distance can be ignored or otherwise not used in the determination of a recommended safe speed.

The reference vehicle 300 and/or one or more of the proximate vehicles 302, 304, 306, 307, 308 can include one or more of the components of the system 100 for determining personalized speed limit information shown in FIG. 1. For instance, the reference vehicle 300 and/or one or more of the proximate vehicles 302, 304, 306, 307, 308 can include one or more servers 105, one or more databases 110, and/or one or more vehicle safety modules 125. The reference vehicle 300 and/or one or more of the proximate vehicles 302, 304, 306, 307, 308 can include one or more of the systems shown in FIG. 2.

The reference vehicle 300 can be communicatively linked to one or more proximate vehicles 302, 304, 306, 307, 308 through one or more communication networks. The description of communication network 130 can apply to the communication links between the reference vehicle 300 and one or more of the proximate vehicles 302, 304, 306, 307, 308. In some arrangements, the proximate vehicles can be vehicles that are traveling in the same direction as the reference vehicle 300. In some arrangements, the proximate vehicles may also be vehicles that are traveling in an opposite or transverse direction as the reference vehicle. However, in other arrangements, data received from proximate vehicles that are traveling in an opposite or transverse direction as the reference vehicle can be ignored or not considered in the determination of a recommended safe speed limit.

One or more of the proximate vehicles 302, 304, 306, 307, 308 can share its vehicle data with the reference vehicle 300. Likewise, the reference vehicle 300 can share its vehicle data with one or more of the proximate vehicles 302, 304, 306, 307, 308. Any suitable information can be shared between the vehicles, such as information that is relevant to the determination of a recommended safe speed limit. Examples of such information include vehicle speed data 242 and/or vehicle condition data 244.

Data from the one or more proximate vehicles 302, 304, 306, 307, 308 can also be obtained by using one or more proximate vehicle sensors 246. The proximate vehicle sensors 246 can be operable to detect, determine, assess, measure and/or sense any suitable information or data relating to a proximate vehicle. For instance, the proximate vehicle sensors 246 can be operable to detect, determine, assess, measure and/or sense the speed of a proximate vehicle and/or the proximity of a proximate vehicle.

Based on the vehicle safe speed data 135 received from the one or more vehicle safe speed data source 140s, the vehicle safe speed module 1245 can determine a recommended safe speed limit 190 for the vehicle 180. "Recommended safe speed limit" is a maximum speed that a current driver should be driving at the present moment for safety purposes.

In some instances, the recommended safe speed limit 190 can be lower than the actual speed limit established for the current section of the road. In some instances, the recommended safe speed limit 190 can be equal to the actual speed limit established for the current section of the road.

Any combination of data from the vehicle safe speed data sources 140 can be used to determine the recommended safe speed limit. In one or more arrangements, the recommended safe speed limit can be determined by the reaction time of the driver, the driving characteristics of the driver, the vehicle condition, weather conditions, and/or any driver preferences. For instance, if the vehicle 180 has low tire pressure in one of its wheels, the recommended safe speed limit can account for this condition by adjusting the recommended safe speed limit (e.g. reducing the recommended safe speed limit).

The visibility distance can also impact the recommended safe speed limit 190. For instance, if the visibility is less than 900 feet, the recommended safe speed limit 190 can be about 65 miles per hour or less. If the visibility is less than 660 feet, the recommended safe speed limit 190 can be about 55 miles per hour or less. If the visibility is less than 450 feet, the recommended safe speed limit 190 can be about 45 miles per hour or less. If the visibility is less than 280 feet, the recommended safe speed limit 190 can be about 35 miles per hour or less. These recommended safe speed limits 190 are provided merely as examples to facilitate the discussion. These recommended safe speed limits can vary for each driver and/or for each type of driver. Further, other factors based on any of the information or data collected herein can result in the recommended safe speed limits being adjusted.

Proximate vehicle data 240 can be useful in determining a recommended safe speed limit. In the absence of proximate vehicle data 240, the system 100 can determine the recommended safe speed limit 190 based on one or more of the other vehicle safe speed data sources 140. For example, the recommended safe speed limit 190 can be based on driver data 200, vehicle data 210, external condition data 220 and/or predictive data 230. As an example, the recommended safe speed limit 190 for the vehicle 180 can be 75 miles per hour. However, if there is a proximate vehicle in located in front of the vehicle 180 and the proximate vehicle data 240 from the proximate vehicle indicates that the proximate vehicle has developed a brake malfunction, then the recommended safe speed limit 190 can be adjusted accordingly based on this data. For example, the personalized speed limit for the vehicle 180 can be reduced from 75 miles per hour to 40 miles per hour.

The determined recommended safe speed limit 190 can be presented to the current driver 150 of the vehicle 180. In one or more arrangements, the recommended safe speed limit 190 can be presented to one or more current passengers 15 of the vehicle 180 and/or to one or more non-passengers 160. The recommended safe speed limit 190 can be sent to a recipient in one or more suitable ways. Further, the recommended safe speed limit 190 can be sent to a plurality of recipients in one or more ways. The recommended safe speed limit 190 can be sent to different recipients in different ways.

The recommended safe speed limit can be presented in any suitable manner. In one or more arrangements, the recommended safe speed limit can be presented in a visual manner. As an example, the recommended safe speed limit 190 can be presented on one or more vehicle displays 120, including any of those listed above. In one or more arrangements, the recommended safe speed limit can be presented in an audible manner. As an example, the recommended safe speed limit 190 can be presented over one or more in-vehicle audio channels. The recommended safe speed limit 190 can be presented over any suitable in-vehicle user interface.

In one or more arrangements, the recommended safe speed limit 190 can be sent to one or more recipients in any suitable form, such as, for example, an electronic mail message, an instant message (IM), a Short Messaging System (SMS), or a system message. In such instances, the message can be created within the one of the servers 105, vehicle safety module 125 or other system. The sent recommended safe speed limit 190 can be received on any of a variety of communication devices executing suitable communication software, such as a computer system or other information processing system. In one or more arrangements, the recommended safe speed limit 190 can be sent to a portable or mobile computing device, e.g., a mobile telephone, a smart phone, a wireless-enabled personal digital assistant, a portable computer, e.g., laptop, tablet or the like. Each of these devices can include and/or execute suitable communication software, which enables the device to communicate with the server 105 and/or the module 125 through the communication network 130.

Alternatively or in addition to the recommended safe speed limit 190, the system can be configured to present a safety message 195 to one or more recipients, including the current driver, one or more passengers and/or one or more non-passengers. "Safety message" is any information relevant to the safe driving of the vehicle. The safety message 195 can be presented to current passenger of the vehicle, and/or to a current non-passenger of the vehicle. The safety message 195 can be sent to a recipient in one or more suitable ways, including in any of the ways described above in connection with the recommended safe speed limit 190. Further, the safety message 195 can be sent to a plurality of recipients in one or more ways. The safety message 195 can be sent to different recipients in different ways.

The safety message 195 can be sent under any set of circumstances. For instance, the safety message 195 can be sent based on the historic data of the current driver. For instance, the safety message 195 can be sent if the current driver has had past accidents under the current conditions. Further, the safety message 195 can be sent based on historic data of a particular road segment. For instance, if a certain percentage or quantity of accidents of a particular type of vehicle occurred in this road segment because of exceeding the posted speed limit or other safe speed limit, then the safety message 195 can be sent to the current driver.

Further, if the recommended safe speed limit is less than the posted traffic speed limit by more than a predetermined amount, then a safety message can be sent to the driver with possible reasons for the low speed. For instance, the safety message 195 can advise the driver to check air pressure and/or to replace the tires. As a further example, if the average reaction time of the driver upon seeing an obstacle is above a predetermined threshold (e.g. more than 4 seconds), then the safety message 195 can be sent to notify the driver to increase alertness level.

The safety message 195 can also be sent based on a received preference of the driver 150, a passenger 155 or a non-passenger 160. For instance, the driver 150 might wish to have safety messages 195 sent under one or more of the following conditions: road accident ahead, congestion ahead, and/or travel time messages for the particular destination. The driver 150 can be also given notifications based on other vehicles traveling in the same road segment. For instance, if the recommended safe speed limit for the proximate vehicle traveling in front of and/or behind the vehicle 180 is significantly lower (e.g. more than a predetermined amount) than the recommended safe speed limit for the vehicle 180, then a safety message 195 can be sent to the driver to increase its level of alertness.

In one or more arrangements, the actual vehicle speed can be monitored relative to the recommended safe speed limit 190. In instances in which the vehicle speed is not in compliance with the recommended safe speed limit 190 the system can be configured to send safety message or other alert to one or more non-passengers of the vehicle. Examples of non-compliance include exceeding the recommended safe speed limit, exceeding the recommended safe speed limit by a predetermined amount, and/or exceeding the recommended safe speed limit for more than a predetermined amount of time. In one arrangement, a safety message 195 can be sent to the parents or legal guardian of a child when the child is driving under unsafe conditions.

The safe speed module 125 can have an associated rules engine. The rules engine can include the rules for determining a safe speed limit. It also includes any rules for when the recommended safe speed limit 190 and/or the safety messages 195 should be presented. The rules engine can also include rules for identifying the recipients of the recommended safe speed limit 190 and/or the safety messages 195. The business rules engine can be dynamic, as the rules can be updated to reflect real-time information and conditions.

FIG. 4 is a flow chart illustrating a method 400 of determining personalized speed limit information in accordance with one embodiment disclosed within this specification. At step 405, a plurality of first inputs related to vehicle safe speed data can be received. In one or more arrangements, each first input can create at least one data item representing the respective vehicle safe speed data. The plurality of first inputs can include vehicle data received from one or more vehicles proximate the first vehicle and communicatively linked to the first vehicle.

At step 410, a recommended safe speed limit for a current driver of a vehicle based on the plurality of first inputs can be determined. At step 415, the determined recommended safe speed limit can be presented to the current driver of the vehicle.

Figure 5:
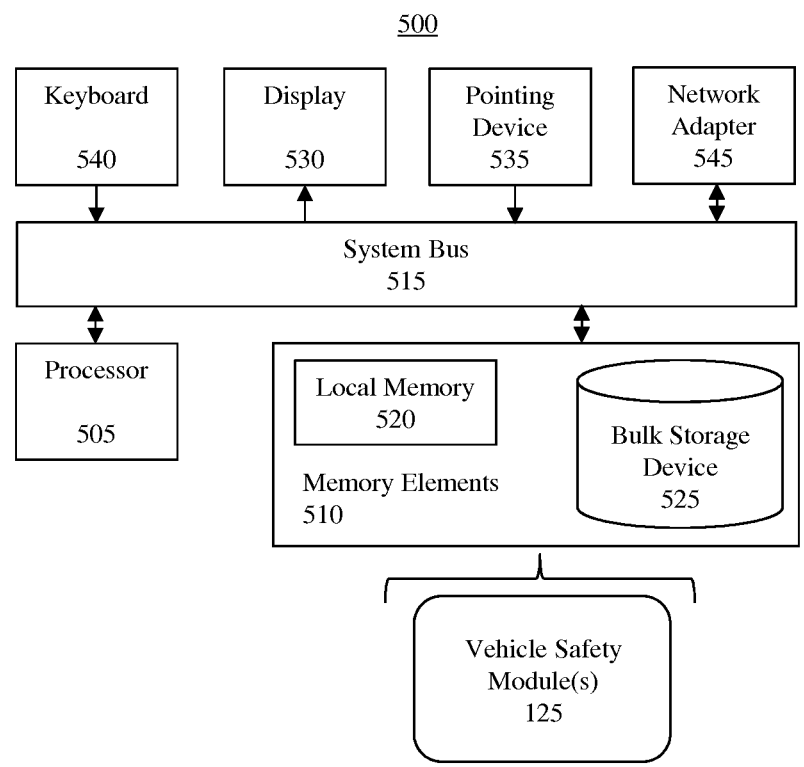
FIG. 5 is a block diagram illustrating a system for determining personalized speed limit information in accordance with one embodiment disclosed within this specification.

FIG. 5 is a block diagram illustrating an example of a data processing system 500. System 500 can include at least one processor (e.g., a central processing unit) 505 coupled to memory elements 510 through a system bus 515 or other suitable circuitry. As such, system 500 can store program code within memory elements 510. Processor 505 executes the program code accessed from memory elements 510 via system bus 515 or the other suitable circuitry.

In one aspect, system 500 is implemented as a computer or other programmable data processing apparatus that is suitable for storing and/or executing program code. It should be appreciated, however, that system 500 can be implemented in the form of any system including a processor and memory that is capable of performing and/or initiating the functions and/or operations described within this disclosure. Further, system 500 can be implemented in any of a variety of different form factors including, but not limited to, a portable device such as a mobile communication device, a tablet computing and/or communication device, a laptop computing device, a desktop computing device, a server, or the like.

Memory elements 510 include one or more physical memory devices such as, for example, local memory 520 and one or more bulk storage devices 525. Local memory 520 refers to RAM or other non-persistent memory device(s) generally used during actual execution of the program code. Bulk storage device(s) 525 can be implemented as a hard disk drive (HDD), solid state drive (SSD), or other persistent data storage device. System 500 also can include one or more cache memories (not shown) that provide temporary storage of at least some program code in order to reduce the number of times program code must be retrieved from bulk storage device 525 during execution.

Input/output (I/O) devices such as a keyboard 540, a display 530, and a pointing device 535 optionally can be coupled to system 500. The I/O devices can be coupled to system 500 either directly or through intervening I/O controllers. One or more network adapters 545 also can be coupled to system 500 to enable system 500 to become coupled to other systems, computer systems, remote printers, and/or remote storage devices through intervening private or public networks. Modems, cable modems, wireless transceivers, and Ethernet cards are examples of different types of network adapters 545 that can be used with system 500.

As pictured in FIG. 5, memory elements 510 can store a vehicle safety module 125. The vehicle safety module 125, being implemented in the form of executable program code, is executed by system 500 and, as such, is considered an integrated part of system 500. The vehicle safety module 125 can receive a plurality of inputs related to vehicle safe speed data. The vehicle safety module 125 can determine a recommended safe speed limit for a current driver of a vehicle based on the plurality of first inputs. The vehicle safety module 125 can present the determined recommended safe speed limit to the current driver of the vehicle, to a current passenger of the vehicle, and/or to a current non-passenger of the vehicle. Further, the vehicle safety module 125 can present safety messages to the current driver of the vehicle, to a current passenger of the vehicle, and/or to a current non-passenger of the vehicle. Moreover, the vehicle safety module 125, including any inputs, data, information, parameters and/or attributes utilized by the vehicle safety module 125, are functional data structures that impart functionality when employed as part of system 500.

The recommended safe speed limits and/or safety messages can be output to, and stored within, memory elements 510. As used herein, "outputting" and/or "output" can mean storing in memory elements 510, for example, writing to a file stored in memory elements 510, writing to display 535 or other peripheral output device, playing audible notifications, sending or transmitting to another system, exporting, or the like.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The term "computer readable storage medium" means a storage medium that contains or stores program code for use by or in connection with an instruction execution system, apparatus, or device. As defined herein, a "computer readable storage medium" is not a transitory, propagating signal per se. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a plurality of inputs related to vehicle safe speed data for a first vehicle and including:
      vehicle data received from one or more other vehicles proximate the first vehicle,
      historical data traffic condition information,
      predictive data regarding future traffic conditions,
      history data of a current driver of the first vehicle,
      current vehicle condition data, and
      current reaction of the current driver;
   determining, based upon the plurality of inputs, a recommended safe speed limit for the current driver; and
   presenting, to the current driver, the determined recommended safe speed limit, wherein
   the recommended safe speed limit is a calculated maximum speed, in real time, that the current driver should be driving.

2. The method of claim 1, wherein
a safety message, separate from the determined safe speed limit, is communicated to a communication device associated with a recipient of the safety message.

3. The method of claim 2, wherein
the recipient of the safety message includes a non-driver of the first vehicle.

4. The method of claim 3, wherein
the safety message is communicated based upon a received message preference of the recipient of the safety message, and
the received message preference identifies a contemporaneous road condition that will prompt communication of the safety message.

5. The method of claim 3, wherein
the non-driver of the first vehicle is not an occupant of the first vehicle.

6. The method of claim 3, wherein
the non-driver of the first vehicle is an occupant of the first vehicle.

7. The method of claim 3, wherein
the safety message is communicated based upon the first vehicle exceeding the recommended safe speed limit for a predetermined amount of time.

8. The method of claim 3, wherein
the safety message is communicated based upon a current average reaction time of the current driver exceeding a predetermined threshold.

9. A computer hardware system, comprising:
a hardware processor configured to initiate the following executable operations:
  receiving a plurality of inputs related to vehicle safe speed data for a first vehicle and including:
    vehicle data received from one or more other vehicles proximate the first vehicle,
    historical data traffic condition information,
    predictive data regarding future traffic conditions,
    history data of a current driver of the first vehicle,
    current vehicle condition data, and
    current reaction of the current driver;
  determining, based upon the plurality of inputs, a recommended safe speed limit for the current driver; and
  presenting, to the current driver, the determined recommended safe speed limit, wherein
the recommended safe speed limit is a calculated maximum speed, in real time, that the current driver should be driving.

10. The system of claim 9, wherein
a safety message, separate from the determined safe speed limit, is communicated to a communication device associated with a recipient of the safety message.

11. The system of claim 10, wherein
the recipient of the safety message includes a non-driver of the first vehicle.

12. The system of claim 11, wherein
the safety message is communicated based upon a received message preference of the recipient of the safety message, and
the received message preference identifies a contemporaneous road condition that will prompt communication of the safety message.

13. The system of claim 11, wherein
the non-driver of the first vehicle is not an occupant of the first vehicle.

14. The system of claim 11, wherein
the non-driver of the first vehicle is an occupant of the first vehicle.

15. The system of claim 11, wherein
the safety message is communicated based upon the first vehicle exceeding the recommended safe speed limit for a predetermined amount of time.

16. The system of claim 11, wherein
the safety message is communicated based upon a current average reaction time of the current driver exceeding a predetermined threshold.

17. A computer program product, comprising
a non-transitory computer readable storage medium having program code stored therein,
the program code, which when executed by a computer hardware system, causes the computer hardware system to perform:
  receiving a plurality of inputs related to vehicle safe speed data for a first vehicle and including:
    vehicle data received from one or more other vehicles proximate the first vehicle,
    historical data traffic condition information,
    predictive data regarding future traffic conditions,
    history data of a current driver of the first vehicle,
    current vehicle condition data, and
    current reaction of the current driver;
  determining, based upon the plurality of inputs, a recommended safe speed limit for the current driver; and
  presenting, to the current driver, the determined recommended safe speed limit, wherein
the recommended safe speed limit is a calculated maximum speed, in real time, that the current driver should be driving.

18. The computer program product of claim 17, wherein
a safety message, separate from the determined safe speed limit, is communicated to a communication device associated with a recipient of the safety message.

19. The computer program product of claim 18, wherein
the recipient of the safety message includes a non-driver of the first vehicle.

20. The computer program product of claim 19, wherein
the safety message is communicated based upon a received message preference of the recipient of the safety message, and
the received message preference identifies a contemporaneous road condition that will prompt communication of the safety message.

* * * * *